US009263044B1

(12) United States Patent
Cassidy et al.

(10) Patent No.: US 9,263,044 B1
(45) Date of Patent: Feb. 16, 2016

(54) NOISE REDUCTION BASED ON MOUTH AREA MOVEMENT RECOGNITION

(75) Inventors: Ryan H. Cassidy, Seattle, WA (US); Yuzo Watanabe, Seattle, WA (US); Isaac S. Noble, Soquel, CA (US)

(73) Assignee: Amazon Technologies, Inc., Reno, NV (US)

(*) Notice: Subject to any disclaimer, the term of this patent is extended or adjusted under 35 U.S.C. 154(b) by 824 days.

(21) Appl. No.: 13/534,388

(22) Filed: Jun. 27, 2012

(51) Int. Cl.
*G10L 15/24* (2013.01)
*G10L 15/25* (2013.01)

(52) U.S. Cl.
CPC ............. *G10L 15/24* (2013.01); *G10L 15/25* (2013.01)

(58) Field of Classification Search
USPC ............. 704/200–201, 226–245, 251–255, 704/260–261, 266, 270–271, 276, 704/E15.001–E15.05, E21.001–E21.02, 704/E11.001–E11.007
See application file for complete search history.

(56) References Cited

U.S. PATENT DOCUMENTS

| | | | | |
|---|---|---|---|---|
| 4,975,960 A * | 12/1990 | Petajan | | 704/251 |
| 5,553,119 A * | 9/1996 | McAllister | | H04Q 3/0029 379/221.09 |
| 5,625,704 A * | 4/1997 | Prasad | | 382/118 |
| 5,729,694 A * | 3/1998 | Holzrichter et al. | | 705/17 |
| 5,806,036 A * | 9/1998 | Stork | | 704/260 |
| 5,938,447 A * | 8/1999 | Kirksey | | G09B 5/065 348/589 |
| 6,006,175 A * | 12/1999 | Holzrichter | | A61B 5/0507 704/205 |
| 6,272,466 B1 * | 8/2001 | Harada et al. | | 704/270 |
| 6,396,954 B1 * | 5/2002 | Kondo | | 382/224 |
| 6,483,532 B1 * | 11/2002 | Girod | | H04N 7/142 348/14.12 |
| 6,503,197 B1 | 1/2003 | Nemirovski | | A61B 5/16 128/898 |
| 6,647,368 B2 * | 11/2003 | Nemirovski | | H04B 1/3877 600/300 |
| 6,707,921 B2 * | 3/2004 | Moore | | G02C 11/06 381/327 |
| 7,136,818 B1 * | 11/2006 | Cosatto | | G10L 15/1807 704/270.1 |
| 7,599,475 B2 * | 10/2009 | Eilam et al. | | 379/88.09 |
| 8,271,262 B1 * | 9/2012 | Hsu et al. | | 704/3 |
| 2002/0019732 A1 * | 2/2002 | Kikinis et al. | | 704/201 |
| 2002/0087322 A1 * | 7/2002 | Fletcher | | A61B 5/4803 704/270 |
| 2002/0097380 A1 * | 7/2002 | Moulton | | G03B 31/00 325/5 |
| 2002/0105575 A1 * | 8/2002 | Hinde | | G10L 15/24 348/14.01 |
| 2002/0116197 A1 * | 8/2002 | Erten | | 704/273 |
| 2002/0194005 A1 * | 12/2002 | Lahr | | 704/271 |
| 2003/0033149 A1 * | 2/2003 | Milligan | | G10L 21/06 704/275 |
| 2003/0083872 A1 * | 5/2003 | Kikinis | | 704/243 |
| 2003/0171921 A1 * | 9/2003 | Manabe et al. | | 704/232 |
| 2003/0212552 A1 * | 11/2003 | Liang et al. | | 704/231 |
| 2003/0212557 A1 * | 11/2003 | Nefian | | 704/256 |
| 2004/0117191 A1 * | 6/2004 | Seshadri | | G10L 15/25 704/275 |
| 2004/0243416 A1 * | 12/2004 | Gardos | | G10L 15/25 704/275 |
| 2005/0102134 A1 * | 5/2005 | Manabe | | G06F 3/015 704/207 |

(Continued)

*Primary Examiner* — Pierre-Louis Desir
*Assistant Examiner* — David Kovacek
(74) *Attorney, Agent, or Firm* — Novak Druce Connolly Bove + Quigg LLP

(57) ABSTRACT

A computing device can capture video data of at least a portion of a mouth area (e.g., mouth, lips, tongue, chin, jaw) of a user of the device. The computing device can also capture sound data including a voice of the user as well as noise (e.g. background noise). The video data can be processed to detect a movement of the portion of the mouth area. The movement of the portion of the mouth area can be analyzed and compared with mouth area movement models characteristic of oral communication (e.g., speech, song). If the movement of the portion of the mouth area corresponds to at least one model characteristic of oral communication, then the movement indicates that the user is likely engaging in oral communication. Noise reduction can be applied and/or increased on the captured sound data to reduce noise and in turn enhance the user's voice.

25 Claims, 8 Drawing Sheets

(56) References Cited

U.S. PATENT DOCUMENTS

| | | | | |
|---|---|---|---|---|
| 2005/0144013 A1* | 6/2005 | Fujimoto | G10L 15/22 | |
| | | | 704/277 | |
| 2005/0197843 A1* | 9/2005 | Faisman | G10L 15/24 | |
| | | | 704/276 | |
| 2005/0256712 A1* | 11/2005 | Yamada | G10L 15/08 | |
| | | | 704/255 | |
| 2006/0079291 A1* | 4/2006 | Granovetter | G06F 17/289 | |
| | | | 455/563 | |
| 2006/0247927 A1* | 11/2006 | Robbins | H03G 3/32 | |
| | | | 704/225 | |
| 2007/0016426 A1* | 1/2007 | Hershey et al. | 704/277 | |
| 2007/0136071 A1* | 6/2007 | Lee et al. | 704/270 | |
| 2008/0317264 A1* | 12/2008 | Wynnychuk | A63F 13/06 | |
| | | | 381/150 | |
| 2010/0070268 A1* | 3/2010 | Sung | G10L 15/24 | |
| | | | 704/203 | |
| 2010/0238323 A1* | 9/2010 | Englund | G11B 27/034 | |
| | | | 348/239 | |
| 2010/0245585 A1* | 9/2010 | Fisher et al. | 348/164 | |
| 2010/0268534 A1* | 10/2010 | Kishan Thambiratnam et al. | 704/235 | |
| 2010/0277579 A1* | 11/2010 | Cho | G06K 9/00335 | |
| | | | 348/61 | |
| 2011/0076968 A1* | 3/2011 | Seshadri | 455/114.2 | |
| 2011/0112833 A1* | 5/2011 | Frankel et al. | 704/235 | |
| 2011/0178798 A1* | 7/2011 | Flaks et al. | 704/226 | |
| 2011/0221671 A1* | 9/2011 | King, III | G02B 27/017 | |
| | | | 345/156 | |
| 2011/0224978 A1* | 9/2011 | Sawada | G06K 9/00221 | |
| | | | 704/231 | |
| 2011/0257971 A1* | 10/2011 | Morrison | 704/233 | |
| 2012/0053931 A1* | 3/2012 | Holzrichter | G10K 11/175 | |
| | | | 704/200.1 | |
| 2012/0203559 A1* | 8/2012 | McKenna et al. | 704/275 | |
| 2012/0253805 A1* | 10/2012 | Rajakumar et al. | 704/236 | |
| 2012/0269332 A1* | 10/2012 | Mukund | 379/201.06 | |
| 2012/0271632 A1* | 10/2012 | Do et al. | 704/246 | |
| 2013/0021459 A1* | 1/2013 | Vasilieff | G10L 25/78 | |
| | | | 348/77 | |
| 2014/0337016 A1* | 11/2014 | Herbig | G10L 25/27 | |
| | | | 704/201 | |

* cited by examiner

NOISE REDUCTION BASED ON MOUTH AREA MOVEMENT RECOGNITION

BACKGROUND

Communication is an important aspect of modern life. People use client computing devices, such as smartphones, tablets, and laptops, to communicate with others every day. For example, a user can use his/her client computing device to call a parent, video chat with a friend, and send voice messages to a colleague. However, a user using a computing device to communicate with another might not always be in an ideal environment for clear communication, such as a quiet, secluded area. In fact, the user may frequently be in noisy environments. For example, the user may be at a bar, at a restaurant, at a party, or on a bus, where the background noise can interfere with or drown out the user's own voice during communication. Conventional noise cancellation attempts to cancel out such background noise, typically by applying noise cancellation on the overall, continuous sound retrieved by a microphone. However, conventional noise cancellation can be inadequate or insufficient because conventional approaches do not effectively take into account all of the factors surrounding human oral communication.

BRIEF DESCRIPTION OF THE DRAWINGS

Various embodiments in accordance with the present disclosure will be described with reference to the drawings, in which.

DETAILED DESCRIPTION

Figure 1A:
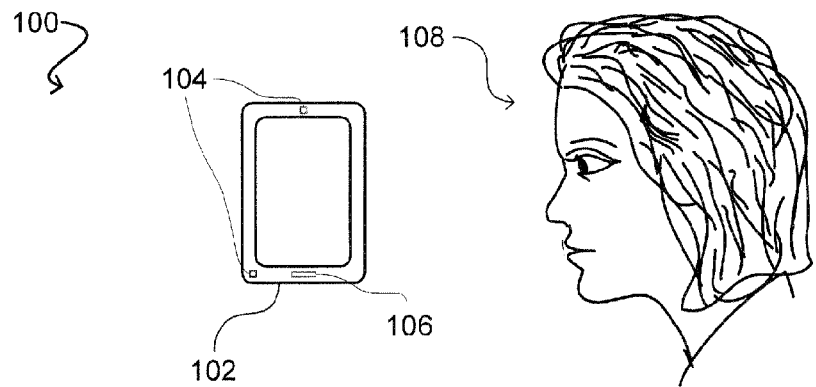
FIG. 1A illustrates an example environment in which aspects of the various embodiments can be utilized.

Systems and methods in accordance with various embodiments of the present disclosure overcome one or more of the above-referenced and other deficiencies in conventional approaches to noise reduction during oral communication. Various embodiments attempt to reduce noise when it is determined that a user is engaging in oral communication. In particular, various embodiments use a camera (or other device) to capture image information of a portion of a user's mouth area (e.g., mouth, lips, chin, jaw), process the image information to determine whether the user is likely engaging in oral communication, and reduce noise when it is determined that the user is likely engaging in oral communication.

In some embodiments, a computing device can provide noise reduction based on mouth area movement recognition. For example, the computing device can receive image information showing at least a portion of a mouth area of a user of the device. The image information can be received from one or more image capture components. The device can also receive audio information. The audio information can be received from one or more audio capture components. The audio information can include at least a sound from the mouth of the user. The image information can be processed to determine a movement of the portion of the user's mouth area. If it is determined that the movement of the portion of the user's mouth area indicates that the user is likely engaging in oral communication, then noise reduction can be applied on the audio information in real-time. Noise included in the audio information can thus be reduced, and the sound from the user's mouth can be enhanced.

In some embodiments, a computing device can use its microphone to capture sound data including voice data from a user of the device. The captured sound data can also include noise (e.g., unintentional background noise). The computing device can use its camera to capture video data showing at least a portion of a mouth area of the user. The captured video data can be processed in order to determine/detect a movement of the portion of the user's mouth area. If the movement is determined/recognized to indicate that the user is likely speaking, then noise cancellation can be applied on the captured sound data to reduce noise in real-time. As such, the noise in the sound data captured by the microphone is reduced, resulting in better sounding voice data from the user. The sound data including the user's voice data and with reduced noise can be transmitted over a communication network.

In some embodiments, when it is determined that the user is likely not engaging (or intending to engage) in communication, transmission of sound (e.g., voice) data can be paused/terminated and/or one or more audio capture components (e.g., microphones) of the computing device can be disabled/muted. For example, if it is determined that the user is not moving his/her lips or merely using his/her mouth to eat/chew, then he/she is not engaging in oral communication. As such, there is no need to capture and transmit sound data, and the other endpoint(s) of the communication will not need to receive/hear unnecessary background noise.

FIG. 1A illustrates an example environment 100 in which aspects of the various embodiments can be utilized. In some embodiments, the example environment 100 can include a computing device 102, one or more image capture components 104 on the computing device 102, and one or more audio capture components 106 on the computing device 102. The one or more image capture components 104 can capture image/video data of the user 108. The one or more audio capture components 106 can capture voice and sound from the user 108 for engaging in oral communication. Thus, a user 108 of the computing device can engage in oral communication using the computing device 102. For example, the user 108 can use the computing device 102 to place a telephone call, to engage in video chatting, to record and send voice messages, etc.

Figure 1B:
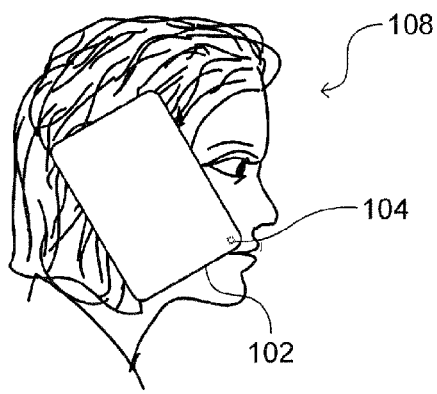
FIG. 1B illustrates an example right profile view of the user and the computing device from the example environment of FIG. 1A.
Figure 1C:
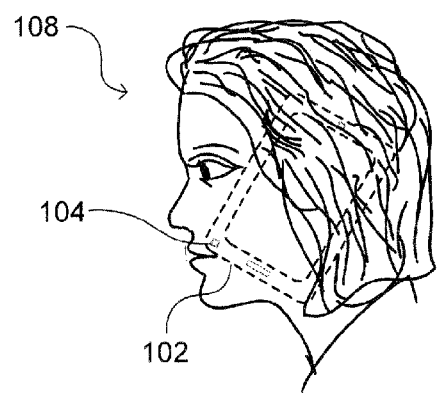
FIG. 1C illustrates an example left profile view of the user and the computing device from the example environment of FIG. 1A.

FIG. 1B illustrates an example right profile view of the user and the computing device from the example environment of FIG. 1A. FIG. 1C illustrates an example left profile view of the user and the computing device from the example environment of FIG. 1A. With reference to FIG. 1B and FIG. 1C, the user 108 can use the computing device 102 to engage in oral communication, such as to make a telephone call, for example. The computing device 102 can have at least one image capture component 104, such as a camera. The at least one image capture component 104 can capture image (e.g., video) information of at least a portion of the user's 108 mouth area, for example, including his/her lips, mouth, tongue, chin, and/or jaw. In some embodiments, the image capture component 104 can be located at a bottom corner of the computing device 102. For example, an image capture component 104 can be located at the bottom left corner of the face of the computing device 102, assuming that a user is likely right-handed and will bring his/her computing devices next to the right side of his/her face when making phone calls such that the image capture component at the bottom left corner will have a view of his/her mouth area. It is also contemplated that the at least one image capture component 104 can be located at various other locations on the computing device 102, such as at the bottom right corner or bottom center.

Figure 2A:
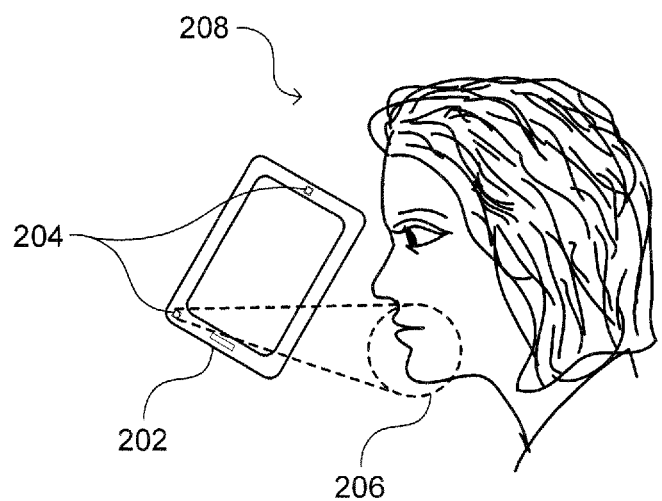
FIG. 2A illustrates an example system embodiment for noise reduction based on mouth area movement recognition.

FIG. 2A illustrates an example system embodiment for noise reduction based on mouth area movement recognition. In some embodiments, a computing device 202 can comprise one or more image capture components 204 to capture image information about at least a portion 206 of a user's 208 mouth area. For example, at least one image capture component 204 (e.g., camera) on the computing device 202 can capture (e.g., record, obtain, gather) video data about at least a portion 206 of the user's 208 mouth area, which can include the user's mouth, lips, teeth, tongue, chin, jaw, etc. The video data captured can be processed and analyzed to detect and recognize the mouth area of the user 208. If it is determined that one or more movements of the user's mouth area in the video data correspond to movements characteristic of oral communication, then it is likely that the user is engaging in oral communication.

Figure 2B:
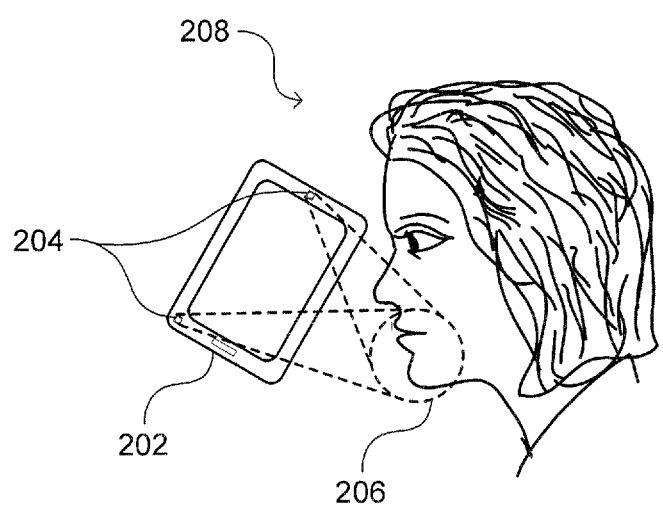
FIG. 2B illustrates an example system embodiment for noise reduction based on mouth area movement recognition.

In some embodiments, a plurality of image capture components 204 (e.g., cameras) on the computing device 202 can be utilized to capture/record image information about the at least the portion 206 of the mouth area of the user 208, as illustrated in FIG. 2B. For example, in some embodiments, the user 208 can be making a phone call with the computing device 202 and placing the device against his/her head, thereby blocking the view of one of the cameras; in this case, another camera that has a view of the mouth area can be used to obtain image data of the portion 206 of the user's mouth area. Similarly, if the user 208 is using headset mode, speakerphone, or hands-free mode on his/her computing device 202 and has placed the device 202 such that one of the device's cameras does not have a view of the user's mouth area, another camera that has a view of the user's mouth area can be utilized.

In some embodiments, multiple cameras 204 can be used together for capturing image data. For example, multiple cameras can capture the same portion 206 of the user's mouth area to corroborate and verify the captured video data with each other, thereby increasing the accuracy of the video data. Additionally or alternatively, multiple cameras can capture different portions of the user's mouth area. For example, one camera can focus on the user's lips while another focuses on his/her jaw.

In some embodiments, one camera can be used for a certain task and another camera for another task. For example, if the user is engaging in video chat (e.g., webcam conferencing) using one camera, another camera can be used for capturing mouth area video data. In some embodiments, one camera can perform multiple tasks, such as simultaneously providing for both video chatting and capturing video information of the mouth area.

In some embodiments, the example system embodiment can already have access to various models of mouth area movements which are known (e.g., predefined, already determined) to correspond to oral communication (e.g., talking, singing, etc.). The example system embodiment can compare the captured video data of the mouth area to one or more of the known mouth area movement models. If the movement of the user's mouth area in the video data matches/corresponds to one or more of the predefined mouth area movement models known to be associated with (e.g., characteristic of) speech, for example, then the movement of the user's mouth area suggests that the user is likely engaging in speech. In some embodiments, known mouth area movement models of oral communication can include mouth area movement models for talking, singing, shouting, screaming, sighing, etc.

Figure 3:
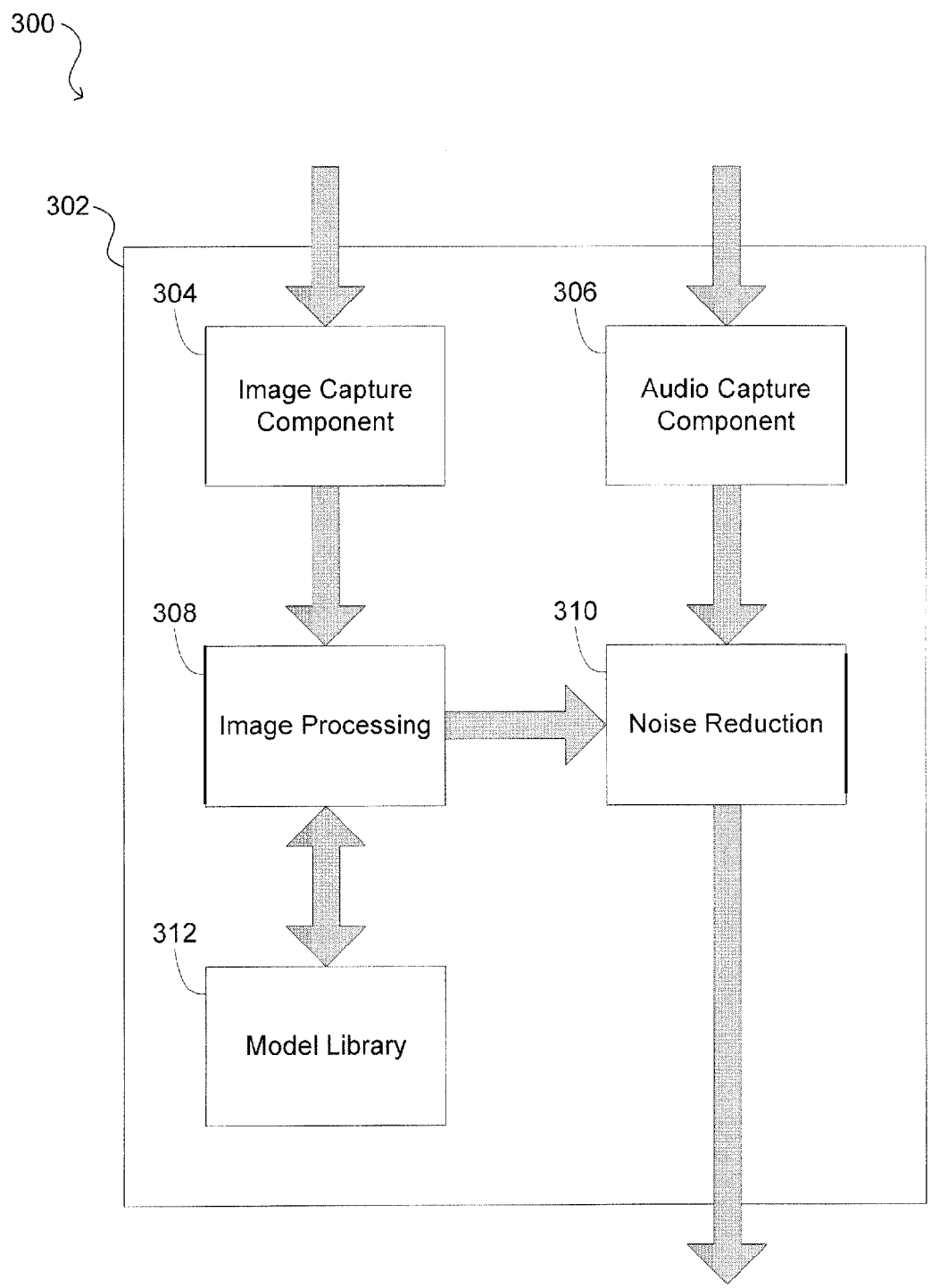
FIG. 3 illustrates an example system embodiment for noise reduction based on mouth area movement recognition.

FIG. 3 illustrates an example system embodiment 300 for noise reduction based on mouth area movement recognition. With reference to the example system embodiment 300, in some embodiments, there can be a computing device 302 comprising an image capture component 304, an audio capture component 306, an image processing component 308, a noise reduction component 310, and a model library 312. The image capture component 304 can be a camera on the computing device 302 for capturing image (e.g. video) data, including image data for a portion of a mouth area of a user of the computing device 302. The audio capture component 306 can be a microphone on the computing device for capturing sound data, including sound data of the user (e.g., user's voice).

The image process component 308 can process the image data captured by the image capture component 304 to determine (e.g., detect, identify) a movement of a mouth area of a user. The image process component 308 can communicate with the model library 312 to analyze the movement of the mouth area. The model library 312 can store one or more models of mouth area movements know/predefined to be characteristic of oral communication (e.g., speaking, singing). The image process component 308 can compare the movement of the mouth area from the image data with one or more models stored in the model library 312. If the movement of the mouth area from the image data matches/corresponds to one or more models in the model library 312 that are characteristic of oral communication, then the movement of the mouth area can be recognized/denoted as representing oral communication. As such, when it is determined that a movement of the mouth area of the user corresponds to a model for oral communication, it is an indication that the user is likely engaging in oral communication.

In some embodiments, determining and/or recognizing a movement of the mouth area can utilize, at least in part, facial recognition and/or feature detection. In some embodiments, determining and/or recognizing a movement of the mouth area can require a minimum level of training for the computing device. In some embodiments, one or more models characteristic of oral communication can be built and/or trained based on the mouth area movements of the user.

When the movement of the mouth area of the user corresponds to a model for oral communication (e.g., when the user is likely engaging in oral communication), the noise reduction component 310 can implement and/or increase noise reduction (e.g., noise cancellation). For example, the user can be making a phone call using the computing device in a noisy setting, such as at a bar or party, and/or there can be noise coming from the other end of the communication channel (e.g., a user at the other end is using speaker-phone mode and/or also in a noisy setting). When the computing device detects that the user is engaging in oral communication (e.g., speaking), the computing device can reduce or cancel out the background noise of the noisy environment and/or noise from the other end, thereby improving the quality of the user's oral communication. In some embodiments, the computing device can deactivate/mute the computing device's audio capture component (e.g., microphone) when it is determined that the user's mouth area is not moving in accordance with a model for oral communication (e.g., the mouth area is not moving, the mouth area movement corresponds to eating/chewing, etc.). As a result, the quality of the sound transmission from the user to other end can be improved as the noise is reduced.

In some embodiments, the computing device can automatically adjust the amount of noise reduction applied. The noise reduction can be automatically adjustable based on a sound quality (e.g., volume, clarity) of the sound from the user relative to that of the noise. For example, if the computing device detects a high level of noise relative to the user's voice, the device can increase noise reduction; or if the user's voice is very soft and can be affected by noise reduction, then the computing device can decide to decrease noise reduction.

In some embodiments, the user can manually pause or deactivate noise reduction based on mouth area movement. For example, if the user is at a concert and wants the sounds in his/her environment to be transmitted to the other end, the user can pause/deactivate the noise reduction such that the background sounds (that might otherwise have qualified as noise) can be communicated to the other end, independent of any movement of the user's mouth area. In another example, the user can pause/deactivate the noise reduction to play a sound from a media system (e.g., television, music player, etc.) to be communicated to the other end.

Figure 4:
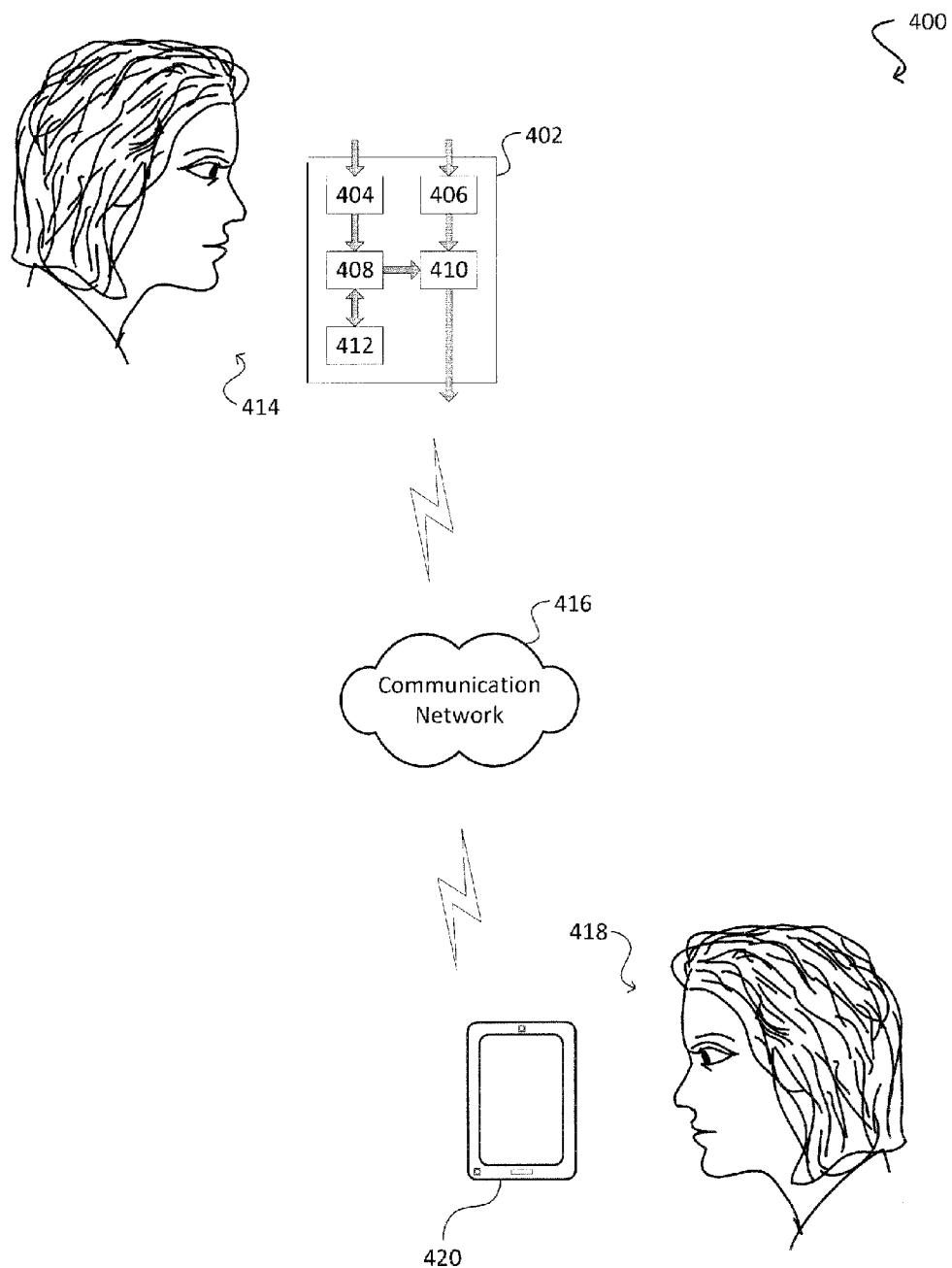
FIG. 4 illustrates an example system embodiment for noise reduction based on mouth area movement recognition.

FIG. 4 illustrates an example system embodiment 400 for noise reduction based on mouth area movement recognition. In some embodiments, the example system 400 can comprise a first computing device 402 of a first user 414. The first computing device 402 can comprise an image capture component 404, an audio capture component 406, an image processing component 408, a noise reduction component 410, and a model library 412. In some embodiments, there can also be a communication network 416 through which the first user 414 can communicate with a second user 418 using a second computing device 420.

For example, the first user 414 can be in a noisy environment, such as on a bus, while trying to use his/her computing device 402 to orally communicate (e.g., including video chat, webcam conference, etc.) with the second user 420. The computing device 402 of the first user 414 can gather image information about at least a portion of the first user's 414 mouth area, for example, when the user 414 initiates the communication (e.g., places a phone call, starts video chat, etc.). The image information can be video data about the portion of the first user's 414 mouth area. The computing device 402 can process the video data of the mouth area to determine whether or not a movement of the portion of the user's 414 mouth area corresponds to one or more models in the model library 412 that are characteristic of oral communication. If so, the computing device 402 can recognize the mouth area movement as corresponding to oral communication, which indicates that the user 414 is likely engaging in oral communication. As such, the computing device 402 can automatically attempt to reduce any undesired noise, such as that coming from being on the noisy environment of the bus. The oral communication from the user 414, having noise reduced, can be transmitted over a communication network 416 (e.g., cellular network, Internet, intranet, LAN, WLAN, etc.) to the second computing device 420 to be received by the second user 418.

In some embodiments, when the computing device 402 determines that the user 414 is not likely engaging in oral communication, the noise reduction component 410 needs not apply/increase noise reduction. In some embodiments, when it is determined that oral communication by the user 414 is not likely occurring, the audio capture component 406 of the device 402 can be deactivated/muted and/or the transmission paused/terminated, such that the second user 418 will not receive (e.g., hear) noise.

Figure 5:
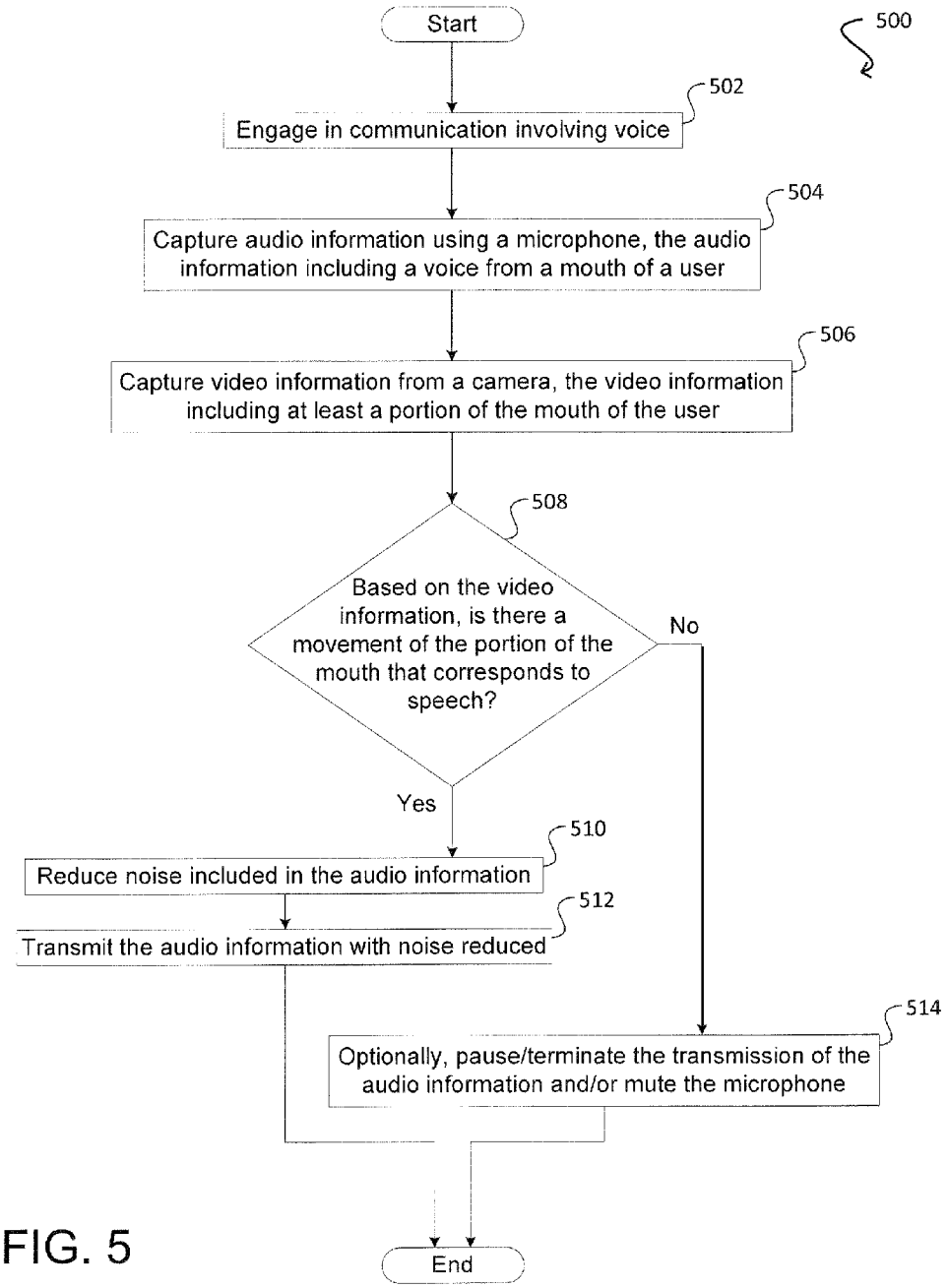
FIG. 5 illustrates an example method embodiment for noise reduction based on mouth area movement recognition.

FIG. 5 illustrates an example method embodiment 500 for noise reduction based on mouth area movement recognition. It should be understood that there can be additional, fewer, or alternative steps performed in similar or alternative orders, or in parallel, within the scope of the various embodiments unless otherwise stated. The example method embodiment 500 can engage in communication over a network at step 502. The communication can be an oral communication which includes transmission of voice data. For example, a computing device can transmit (and receive) voice data to (and from) another device over a cellular network and/or the Internet. At step 504, video information showing at least a portion of a mouth area of a user of the computing device can be captured using a camera on the computing device. At step 506, audio information including an amount of noise as well as voice data generated by the user can be captured using a microphone of the computing device. The video information can be processed in order to determine a movement of the portion of the mouth area of the user, at step 508. For example, image processing can be applied to determine/detect the portion of the mouth area and its movement(s). In some embodiments, facial recognition and/or feature detection can be utilized to determine/recognize movements of the portion of the user's mouth area.

If the movement of the portion of the mouth area is determined/recognized to indicate that the user is likely speaking 508, then noise cancellation can be applied on the audio information in real-time to reduce noise 510. For example, noise cancellation techniques and/or algorithms can include, but are not limited to, active noise control/reduction, adaptive filtering, non-adaptive filtering, etc. At step 512, the audio information including the user's voice data and with noise reduced/cancelled can be transmitted during the communication over the network.

Optionally, in some embodiments, if it is determined 508 that the user is likely not speaking, then audio information transmission over the network can be paused and/or terminated 514. Additionally or alternatively, the microphone of the device can be paused and/or muted 514. In some embodiments, an audio level (e.g., volume, clarity, sound quality, etc.) of the audio information can be additionally or alternatively reduced 514. As such, no unnecessary sounds (e.g., when the user is not intending to speak) need to be transmitted to the other endpoint(s) of the communication.

Figure 6:
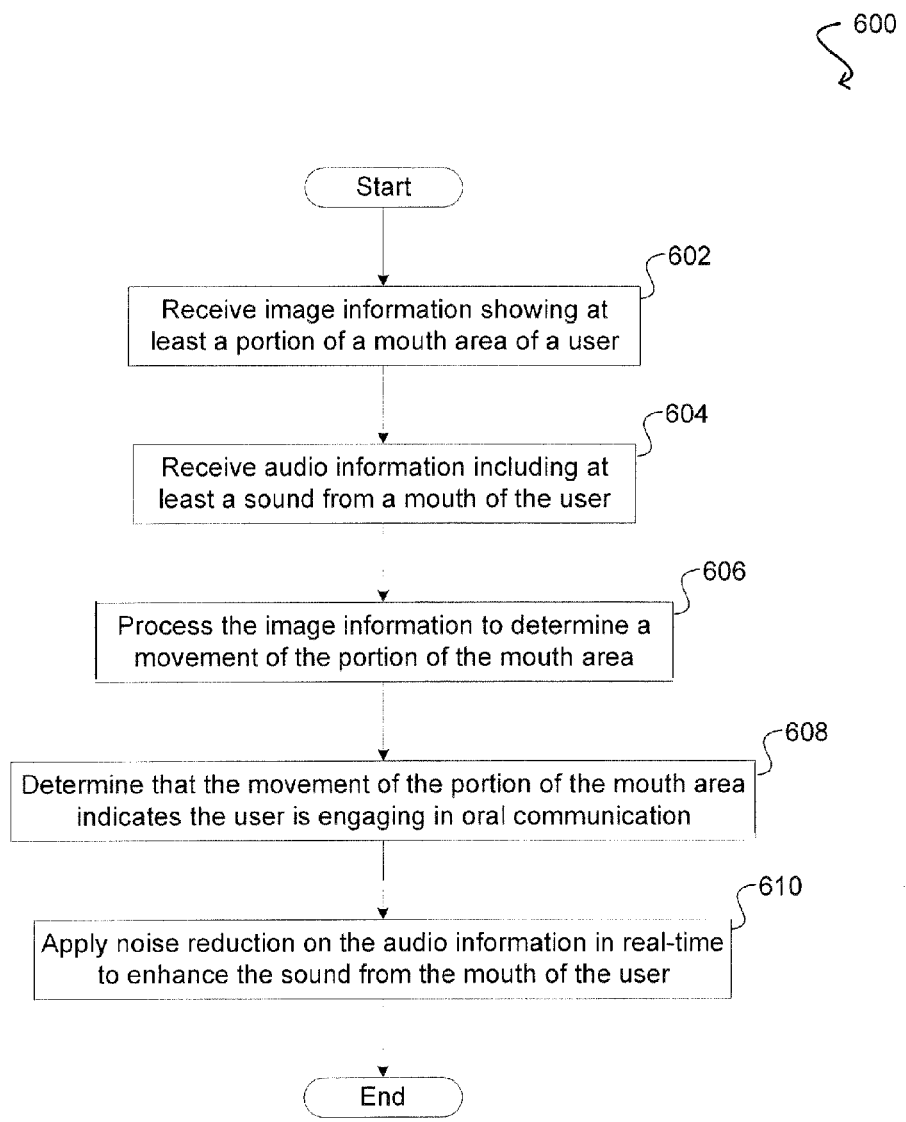
FIG. 6 illustrates an example method embodiment for noise reduction based on mouth area movement recognition.

FIG. 6 illustrates an example method embodiment 600 for noise reduction based on mouth area movement recognition. It should be understood that there can be additional, fewer, or alternative steps performed in similar or alternative orders, or in parallel, within the scope of the various embodiments unless otherwise stated. The example method embodiment 600 can receive image information showing at least a portion of a mouth area of a user of the computing device 602. The image information can be received from one or more image capture components, such as cameras on the device. At step 604, the example method embodiment 600 can receive audio information including at least a sound from a mouth of the user. The sound from the user's mouth can include speaking, singing, shouting, sighing, etc. The example method 600 can continue by processing the image information to determine a movement of the portion of the mouth area of the user 606. When the determined movement of the portion of the user's mouth area indicates that the user is likely engaging in oral communication 608, the example method 600 can apply noise reduction on the audio information in real-time to reduce noise, thereby enhancing the sound from the user's mouth 610.

In some embodiments, a beginning of incoming sound from a user (e.g., user's voice) can be correlated to a beginning of a movement of a portion of the user's mouth area determined. In other words, when a movement of the mouth area is initially determined, that can be an indication of incoming sound from the mouth. For example, a device's audio capture component can be disabled or turned off. When the computing device determines from image information that the user is moving (or starting to move) his/her lips indicating incoming voice data, then the device can turn on or enable its audio capture component to capture the incoming voice data from the user.

In some embodiments, speech-to-text assistance can be implemented. For example, image data including lip and/or tongue movements can be captured by the image capture component. The image data can be processed and analyzed to determine any phonemes (e.g., words) that are spoken by the user. In some embodiments, the image data showing the user's lip/tongue movements can be compared with lip/tongue movement models in the model library that are characteristic of specified phonemes/words. For example, the word "hello" can have a particular lip/tongue movement model associated with it. If the image data including the user's lip/tongue movement is processed and it is determined that the user's movement corresponds to the movement model characteristic of "hello," then the user's spoken word can be transcribe from speech into text. As such, the present disclosure allows for speech/voice transcription based on mouth area movement recognition. Additionally or alternatively, the present disclose at least allows for speech/voice transcription assistance, such as by verifying the accuracy of other speech-to-text approaches or by supplementing other speech-to-text approaches.

Furthermore, various embodiments consistent with the present disclosure can be implemented for multiple computing devices engaging in communication. For example, in some embodiments, a first computing device (e.g., having a camera but no noise reduction capability) can capture image data, process the image data to recognize mouth area movement, and signal to a second computing device (e.g., having noise reduction capability) to apply noise reduction on oral communication received from the first device when a first user of the first device orally communicates. In some embodiments, the first device (e.g., not having image processing capability) can transmit image data of the mouth area of the first user to the second device (e.g., having image processing capability) for processing and mouth area movement recognition.

Figure 7:
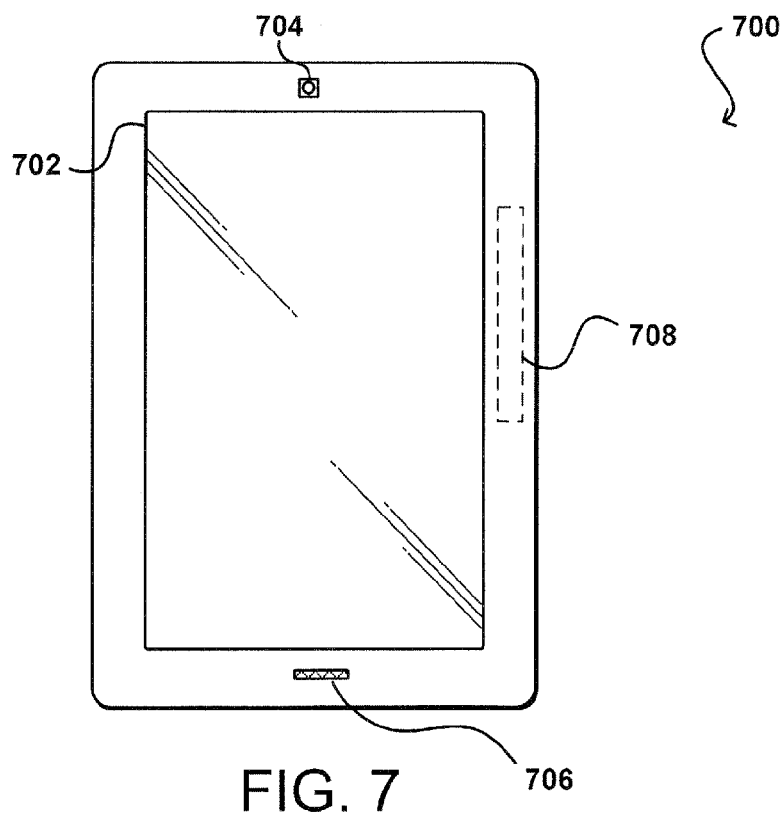
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
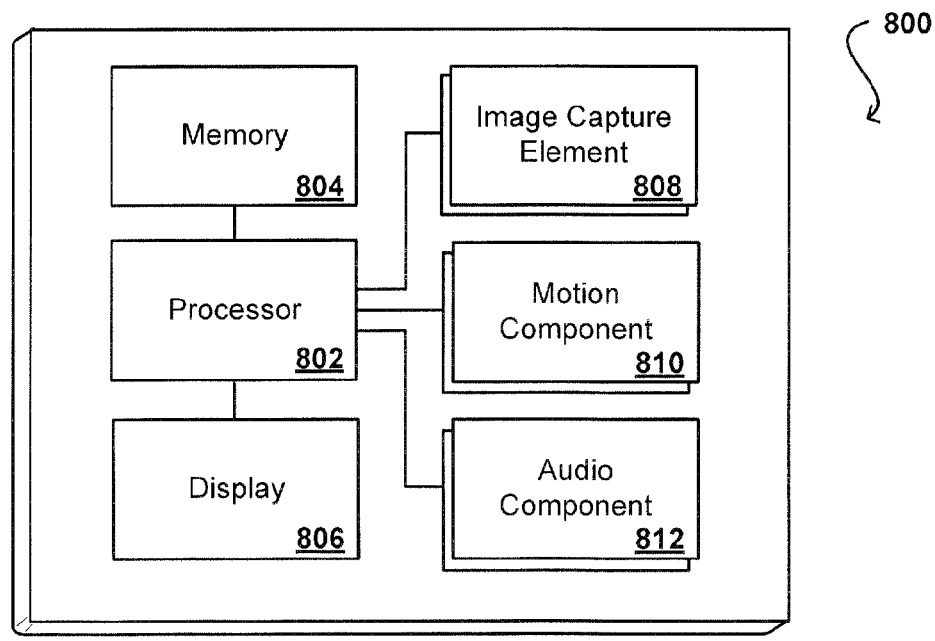
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
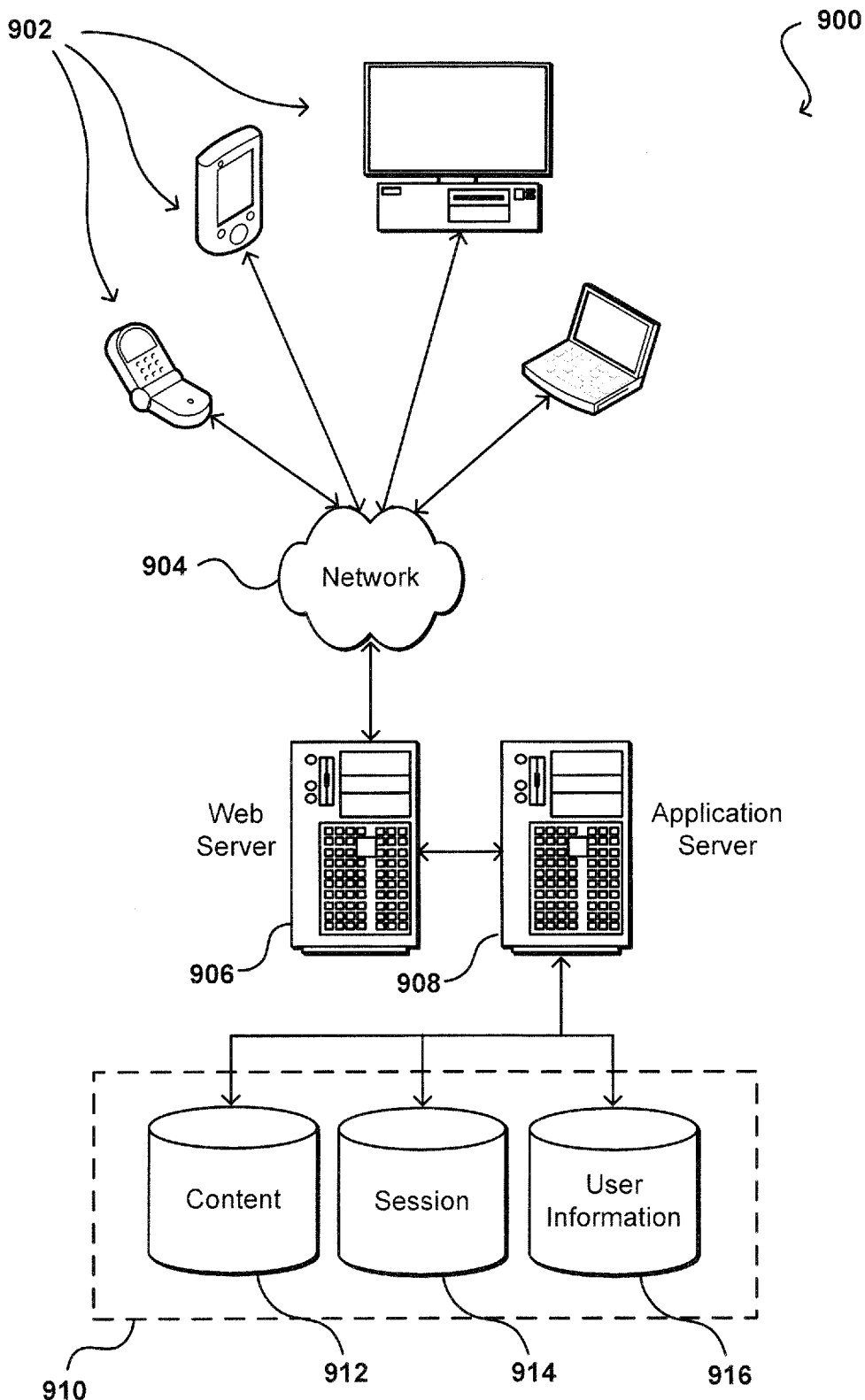
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    capturing video information using a camera of a computing device, the video information showing at least a portion of a mouth area of a user of the computing device;
    capturing audio information using a microphone of the computing device, the audio information including voice data generated by the user and an amount of noise;
    processing the video information to determine a movement of the portion of the mouth area of the user;
    applying noise reduction to the audio information to generate modified audio information that corresponds to a reduction of at least a portion of the noise;
    transmitting, over a communication network, the modified audio information;
    determining that the movement of the portion of the mouth area does not correspond to user speech; and
    causing at least one of capturing the audio information, applying the noise reduction, or transmitting the modified audio information to cease being performed for at least a period of time.

2. The computer-implemented method of claim 1, wherein determining that the movement of the portion of the mouth area does not correspond to the user speech includes:
    comparing the video information to one or more mouth area movement models that are characteristic of speech.

3. The computer-implemented method of claim 1, wherein the portion of the mouth area includes at least one of a mouth, a lip, a tongue, a chin, a jaw, a tooth, or facial hair of the user.

4. A computer-implemented method, comprising:
    receiving image information showing at least a portion of a face of a user of a computing device;
    receiving audio information corresponding to the image information;
    processing the image information to determine a movement of the portion of the face of the user;
    applying noise reduction to the audio information to generate modified audio information;
    determining that the movement of the portion of the face of the user does not correspond to communication; and
    causing at least one of receiving the audio information or applying the noise reduction to cease being performed for at least a period of time.

5. The computer-implemented method of claim 4, wherein the portion of the face of the user comprises a portion of a mouth area of the user.

6. The computer-implemented method of claim 4, further comprising:
    transmitting, over a communication network, the modified audio information.

7. The computer-implemented method of claim 4, wherein the image information is received from at least one image capture component of the computing device and the audio information is received from at least one audio capture component of the computing device.

8. The computer-implemented method of claim 5, further comprising:
    reducing an audio level of the audio information based on determining that the movement of the portion of the mouth area does not correspond to oral communication.

9. The computer-implemented method of claim 5, wherein determining that the movement of the portion of the mouth area does not correspond to oral communication includes:
    comparing the image information to one or more mouth area movement models that are characteristic of oral communication.

10. The computer-implemented method of claim 9, wherein the one or more mouth area movement models are generated based at least in part upon one or more historical movements of the user.

11. The computer-implemented method of claim 4, wherein the noise reduction is automatically adjusted based at least in part on quality of the audio information relative to quality of noise in the audio information.

12. The computer-implemented method of claim 5, further comprising:
    performing voice transcription based at least in part upon comparing the movement of the portion of the mouth area to one or more mouth area movement models that are each characteristic of one or more phonemes.

13. The computer-implemented method of claim 5, wherein a beginning of the movement of the portion of the mouth area of the user correlates to a beginning of sound from a mouth of the user.

14. The computer-implemented method of claim 4, wherein the oral communication is associated with at least one of a phone call, a video chat, a voice message, speech recognition, voice transcription, or voice dictation.

15. The computer-implemented method of claim 4, wherein the oral communication utilizes at least one of a headset mode, a handset mode, a speaker-phone mode, or a hands-free mode.

16. The computer-implemented method of claim 4, wherein processing the video information and applying the noise reduction are performed via cloud computing.

17. A computing device, comprising:
    at least one image capture component configured to capture image information;
    at least one audio capture component configured to capture audio information;
    a processor; and
    a memory device including instructions that, upon being executed by the processor, cause the computing device to:
        receive image information showing at least a portion of a face of a user of the computing device from the at least one image capture component;

receive audio information corresponding to the image information from the at least one audio capture component;

process the image information to determine a movement of the portion of the face of the user;

apply noise reduction to the audio information to generate modified audio information;

determine that the movement of the portion of the face of the user does not correspond to oral communication; and cause at least one of ceasing to receive the audio information or ceasing to apply the noise reduction for at least a period of time.

18. The computing device of claim 17, wherein the portion of the face of the user comprises a portion of a mouth area of the user.

19. The computing device of claim 18, wherein the instructions that cause the computing device to determine that the movement of the portion of the mouth area does not correspond to oral communication include causing the computing device to:

compare the image information to one or more mouth area movement models that are characteristic of oral communication.

20. The computing device of claim 19, further comprising: a model library configured to store the one or more mouth area movement models that are characteristic of oral communication.

21. The computing device of claim 17, further comprising: a speaker configured to play audio outputted by the computing device, wherein the audio outputted by the computing device via the speaker contributes to noise in the audio information received from the at least one audio capture component.

22. A non-transitory computer-readable storage medium including instructions that, upon being executed by a processor of a computing device, cause the computing device to:

receive image information showing at least a portion of a face of a user of the computing device;

receive audio information corresponding to the image information;

process the image information to determine a movement of the portion of the face of the user;

apply noise reduction to the audio information to generate modified audio information;

determine that the movement of the portion of the face of the user does not correspond to oral communication; and cause at least one of ceasing to receive the audio information or ceasing to apply the noise reduction for at least a period of time.

23. The non-transitory computer-readable storage medium of claim 22, wherein the portion of the face of the user comprises a portion of a mouth area of the user.

24. The non-transitory computer-readable storage medium of claim 23, wherein the instructions that cause the computing device to determine that the movement of the portion of the mouth area does not correspond to oral communication include causing the computing device to:

compare the image information to one or more mouth area movement models that are characteristic of oral communication.

25. The non-transitory computer-readable storage medium of claim 23, wherein the noise reduction is automatically adjusted based at least in part on quality of the audio information relative to quality of noise in the audio information.

* * * * *